United States Patent [19]

Ogawa et al.

[11] Patent Number: 5,338,579
[45] Date of Patent: Aug. 16, 1994

[54] METHOD OF MANUFACTURING A CHEMICALLY ADSORBED FILM

[75] Inventors: Kazufumi Ogawa; Mamoru Soga; Shinji Ozaki; Shigeo Ikuta, all of Osaka, Japan

[73] Assignee: Matsushita Electric Industrial Co., Ltd., Osaka, Japan

[21] Appl. No.: 68,533

[22] Filed: May 27, 1993

[30] Foreign Application Priority Data

May 27, 1992 [JP] Japan .................. 4-135427

[51] Int. Cl.$^5$ .................................. B05D 1/02
[52] U.S. Cl. ............................... 427/539; 427/387; 427/419.7; 427/407.2; 427/409; 427/411; 427/412; 427/412.1
[58] Field of Search ............ 428/448; 427/407.2, 427/409, 412.1, 419.7, 419.8, 535, 536, 537, 539, 411, 412, 387; 528/10, 39

[56] References Cited

U.S. PATENT DOCUMENTS

| | | | |
|---|---|---|---|
| 3,558,345 | 1/1971 | Baum et al. | 117/54 |
| 3,619,249 | 11/1971 | Cannon . | |
| 4,311,764 | 1/1982 | Franz . | |
| 4,323,603 | 4/1982 | Close | 427/407.1 |
| 4,539,061 | 9/1985 | Sagiv | 427/407.1 |
| 4,810,564 | 3/1989 | Takahashi et al. | 428/213 |
| 4,961,996 | 10/1990 | Carre et al. | 428/421 |
| 5,010,356 | 4/1991 | Albinson | 427/412.1 |
| 5,110,621 | 5/1992 | Sudo et al. | 427/387 |

FOREIGN PATENT DOCUMENTS

| | | |
|---|---|---|
| 0351092A2 | 1/1990 | European Pat. Off. . |
| 0386784A2 | 9/1990 | European Pat. Off. . |
| 0482613A1 | 4/1992 | European Pat. Off. . |
| 0484746A2 | 5/1992 | European Pat. Off. . |
| 2063190 | 7/1971 | France . |

Primary Examiner—Terry J. Owens
Assistant Examiner—Erma Cameron
Attorney, Agent, or Firm—Fish & Richardson

[57] ABSTRACT

A method of manufacturing a chemically adsorbed film, which can efficiently provide a water and oil repelling and anti-contaminating ultra thin film with uniform thickness by spraying a solution comprising a chemical adsorbent on a substrate surface having active hydrogen groups in a dry atmosphere. A chemically adsorbed film can be formed by spraying a chlorosilane-based surface active agent on a substrate surface having active hydrogen groups such as hydroxyl, imino groups or the like. After forming a siloxane-based monomolecular layer or polysiloxane layer beforehand by spraying a chlorosilane compound or a solution comprising a chlorosilane compound on a substrate surface, a chemically adsorbed monomolecular or polymer layer can be formed by spraying a solution comprising a chlorosilane-based surface active agent. The film can be formed in a short time without being inhibited by the shapes and sizes of substrates.

16 Claims, 12 Drawing Sheets

METHOD OF MANUFACTURING A CHEMICALLY ADSORBED FILM

FIELD OF THE INVENTION

The invention relates to a method of manufacturing a chemically adsorbed film on a substrate surface. More particularly, the invention relates to a method of manufacturing a chemically adsorbed film comprising the formation of a chemically adsorbed monomolecular or polymer layer by a coating method or the cumulation of a chemically adsorbed monomolecular or polymer layer via siloxane-based chemically adsorbed layer.

BACKGROUND OF THE INVENTION

It has been generally well known that a monomolecular layer can be formed by a liquid phase adsorption method. In this method, a substrate is dipped and held in a nonaqueous organic solvent containing a chemical adsorbent, and kept for a fixed number of hours for the reaction (EPC No. 0476543A2). In this method, a chemically adsorbed monomolecular layer is formed by a dehydrochlorination reaction between the hydroxyl groups on the substrate surface and the chlorosilyl groups of a chlorosilane-based adsorbent (surface active agent).

A dipping method has been employed for the above-noted conventional chemical adsorption method, and there has been a problem that a large amount of the adsorbent and a big tank are required for a large substrate.

SUMMARY OF THE INVENTION

An objective of the invention is to provide a method of manufacturing a chemically adsorbed film, efficiently forming a film in a short time with only a small amount of adsorbent without being inhibited by the size of the substrate.

In order to accomplish the above objective, a method of manufacturing a chemically adsorbed film of the invention comprises the following procedures:

spraying a solution containing a chlorosilane-based chemical adsorbent comprising a chlorosilyl or thiol group on at least one end of the molecule and at least one group chosen from the group consisting of a straight hydrocarbon, fluorocarbon and siloxane chain on a substrate surface having active hydrogen groups;

generating a condensation reaction between the chlorosilyl group or thiol group of the chemical adsorbent and the active hydrogen group on the substrate surface, thus forming a chemically adsorbed film on the substrate surface via covalent bonds.

It is preferable in this invention that the following procedures are included after the condensation reaction:

washing away the solution containing unreacted chlorosilane-based adsorbent on the substrate surface with a nonaqueous organic solvent;

reacting the chlorosilyl groups left on the substrate surface with water;

drying the substrate surface, thereby forming a chemically adsorbed monomolecular layer on the surface via covalent bonds.

It is also preferable in the invention that the following procedures are included after the condensation reaction:

vaporizing the solution on the substrate surface;

reacting the substrate surface with water;

drying the substrate surface, thus forming a chemically adsorbed polymer layer on the surface via covalent bonds.

It is preferable in the invention that a chemically adsorbed film is formed in the following procedures:

contacting a substrate surface having active hydrogen groups with a chlorosilane-based chemical adsorbent comprising numerous chlorosilyl groups in the molecule in a dry atmosphere, thereby generating a condensation reaction between the active hydrogens on the substrate surface and the chlorosilyl groups of the chemical adsorbent and forming an inorganic siloxane-based chemically adsorbed inner layer;

spraying a solution containing a chlorosilane-based chemical adsorbent having a chlorosilyl group at least one end of the molecule and at least one group selected from the group consisting of a straight hydrocarbon, fluorocarbon and siloxane chain on the inorganic siloxane-based chemically adsorbed inner layer, thus forming a chemically adsorbed film on the inner layer via siloxane bonds.

It is also preferable in the invention that the spray-coating technique of a chlorosilane-based chemical adsorbent is applied for the chemical adsorption reaction.

It is preferable in the invention that the following procedures are included after the condensation reaction between the active hydrogen groups on a substrate surface and the chlorosilyl groups of the chlorosilane-based chemical adsorbent comprising numerous chlorosilyl groups in the molecule;

removing the solution containing unreacted chlorosilane-based adsorbent with a nonaqueous organic solvent;

reacting the chlorosilyl groups left on the substrate surface with water;

drying the substrate surface, thereby forming a chemically adsorbed monomolecular inner layer on the surface.

It is also preferable in the invention that a chemically adsorbed polymer inner layer is formed by vaporizing the solvent, contacting a substrate surface with water and drying the surface after the condensation reaction between the active hydrogen groups on the surface and the chlorosilyl groups of the chlorosilane-based chemical adsorbent comprising numerous chlorosilyl groups in the molecule.

It is preferable in the invention that at least one part of the hydrocarbon chain of the chlorosilane-based chemical adsorbent is substituted with a —$CF_2$— group.

It is preferable in the invention that $CF_3(CF_2)_n(R)_mSiX_pCl_{3-p}$ (wherein n represents 0 or an integer R represents an alkyl, vinyl, ethynyl, aryl group or a substituent comprising a silicon or oxygen atom, m represents 0 or 1, X represents H, an alkyl, alkoxyl group or a substituent comprising a fluoroalkyl or fluoroalkoxy group, and p represents 0, 1 or 2) is used as the chlorosilane-based chemical adsorbent comprising numerous chlorosilyl groups in the molecule.

It is also preferable in the invention that the chlorosilane-based chemical adsorbent used for forming an inner layer is comprised of at least one compound selected from the group consisting of $SiCl_4$, $SiHCl_3$, $SiH_2Cl_2$ and $Cl(SiCl_2O)_nSiCl_3$ (n as an integer).

It is preferable in the invention that the substrate is a material chosen from the group consisting of metals, ceramics, glass, plastic, polymers, paper, fiber and leather.

It is preferable in the invention that active hydrogens are introduced to a substrate surface by treatment in a plasma or corona atmosphere comprising oxygen.

It is preferable in the invention that a chemical adsorption reaction is directed in an atmosphere with 30% or less relative humidity.

It is preferable in the invention that the boiling point of the solvent containing the chlorosilane-based chemical adsorbent is 100°–300° C. in forming a monomolecular layer.

It is also preferable in the invention that the boiling point of the solution containing the chlorosilane-based adsorbent is between room temperature and 100° C. to form a chemically adsorbed polymer layer.

It is preferable in the invention that the solution used for the chemical adsorption is sprayed on the surface at the micron level.

Based on the above-noted composition, a chemically adsorbed film can be formed on a substrate surface by spraying a solution containing a chlorosilane-based chemical adsorbent. As a result, one method of the invention does not require many hours and a tank for the adsorption reaction; thus, a chemically adsorbed film can be formed quickly, and the size of a substrate is not limited to form a chemically adsorbed film on the substrate.

In a method of the invention, a chemically adsorbed film can be formed efficiently on a substrate surface as follows:

spraying a chlorosilane-based adsorbent or a solution containing a chlorosilane-based adsorbent on a substrate surface, thus forming a siloxane-based inner layer;

spraying a chlorosilane-based chemical adsorbent or a solution containing the adsorbent on the substrate surface, thus forming a chemically adsorbed film with neither a tank nor many hours, without being inhibited by the size of the substrate.

A siloxane-based thin inner layer is either a monomolecular or polymer layer in the invention; however, the monomolecular layer, obtaining transparency, is preferable since it can be formed uniformly and easily on a substrate surface.

In one method of the invention, it is preferable that an adsorbent comprising fluorine rather than a hydrocarbon-based adsorbent is used for obtaining superior water and oil repelling and anti-contaminating properties. In the case of using a chemical adsorbent comprising a straight siloxane chain, a water repelling property is improved.

In the above-noted composition of the invention, the adherence of a built-up film to a substrate surface is significantly improved since a siloxane-based thin inner layer is covalently bonded to both the substrate surface and chemically adsorbed outer layer formed on the inner layer.

In the above-noted composition of the invention, the substrate is not limited to the material chosen from the group consisting of metals, ceramics, glass, plastic, polymers, fiber, paper and leather.

It is preferable in the invention that a hydrocarbon-based chemical adsorbent in which at least one part of a hydrocarbon chain is substituted with a —$CF_2$— group is used as the chlorosilane-based adsorbent since the chemical adsorbent can improve water repelling and anti-contaminating properties significantly.

It is preferable in the invention that $CF_3(CF_2)_n(R)_mSiX_pCl_{3-p}$ (wherein n represents 0 or an integer, R represents an alkyl, vinyl, ethynyl group or a substituent comprising a silicon or oxygen atom, m represents 0 or 1, X represents an alkyl, alkoxyl group or a substituent comprising a fluoroalkyl or fluoroalkoxy group, p represents 0, 1 or 2) is used as the chlorosilane-based adsorbent.

In case of using a plastic as a substrate, it is preferable that the surface of the plastic is made hydrophilic by treatment in a plasma or corona atmosphere comprising oxygen, thus the chemically adsorption of siloxane-based molecules occurs with high density.

In the above-noted composition, the chlorosilane-based chemical adsorbent comprising numerous chlorosilyl groups in the molecules is comprised of at least one material chosen from the group consisting of $SiCl_4$, $SiHCl_3$, $SiH_2Cl_2$ or $Cl(SiCl_2O)_nSiCl_3$ (wherein n is an integer), thus a siloxane-based monomolecular layer can be formed efficiently.

It is preferable in the above-noted composition that the treatments are all directed in a dry atmosphere, thereby forming a chemically adsorbed film efficiently.

It is preferable in the invention that the boiling point of the solvent containing the chemical adsorbent is 100°–300° C., thus forming a chemically adsorbed monomolecular layer efficiently.

It is also preferable in the invention that the boiling point of the solution containing the chlorosilane-based adsorbent is below 100° C., thus forming a chemically adsorbed polymer layer efficiently.

The following examples are the films which can be formed by a method of the invention:

(1) a chemically adsorbed monomolecular layer;
(2) a chemically adsorbed polymer layer;
(3) a chemically adsorbed monomolecular layer formed on a siloxane-based monomolecular inner layer;
(4) a chemically adsorbed monomolecular layer formed on a polysiloxane-based inner layer;
(5) a chemically adsorbed polymer layer formed on a siloxane-based monomolecular inner layer; and
(6) a chemically adsorbed polymer layer formed on a polysiloxane-based monomolecular inner layer.

A method of the invention would not be limited by the shape and size of a substrate, and can form a chemically adsorbed film efficiently. A chemically adsorbed film formed by the method of the invention is ultra thin with uniform thickness, pin hole free, durable and heat resistant since the film is chemically bonded to a substrate surface.

At least one method of the invention also does not require a tank for an adsorption reaction procedure, and would not be inhibited by the shape and size of a substrate. The chemically adsorbed film is formed by the spray-coating technique.

Moreover, in forming a chemically adsorbed film on an inner layer, a tank is not required for a chemical adsorption reaction in the invention; thus, a method of the invention would not be limited by the shape and size of a substrate. Since a chemically adsorbed outer layer is chemically bonded to an inner layer which is also chemically bonded to a substrate surface, a built-up film as a whole is ultra thin with uniform thickness, pin hole free, heat resistant and durable. After forming a polysiloxane-based inner layer comprising numerous —SiOH bonds on a substrate surface, a monomolecular or polymer layer is built up by applying a silane-based adsorbent having chlorosilane groups, thereby generating a dehydrochlorination reaction between —OH groups on the polysiloxane-based inner layer and the chlorosilyl groups of the silane-based adsorbent. The outer layer is chemically bonded to the substrate via —SiO bonds; therefore, the film shows excellent adherence.

As explained above, the method of the invention of forming a chemically adsorbed film on a substrate surface by the spraying of an adsorbent in a dry atmosphere is not limited by the shape or type of substrate, which may include plastic, ceramics, glass or the like.

Since a chemically adsorbed film is connected to a substrate surface via a siloxane-based inner layer, the chemically adsorbed film can be formed efficiently and adherently even to a substrate—having a few active hydrogens such as hydroxyl, amino, imino groups or the like—including metals, plastic, ceramics, glass, or the like.

By using a compound having fluorocarbon and chlorosilyl groups as an adsorbent, a water and oil repellent, anti-contaminating and highly durable fluorocarbon-based film can be chemically bonded to a metallic substrate such as Al, Cu, stainless steel or the like. The film is also highly dense, pin hole free, and ultra thin with uniform thickness.

A method of manufacturing a chemically adsorbed film of the invention, therefore, can be applied to electronics, particularly electric goods such as hot plates and rice steamers, and also to automobiles, industrial equipments, mirrors, lenses for glasses or the like which require a heat, weather and abrasion resisting properties.

DETAILED DESCRIPTION OF THE INVENTION

Figure 1:
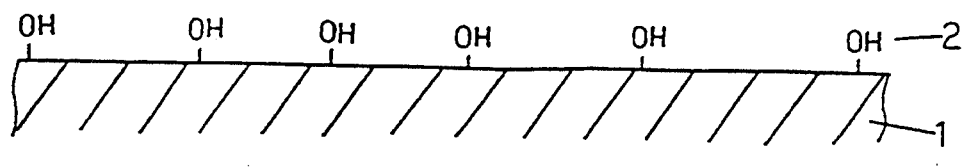
FIG. 1 is a sectional view of a substrate surface of an example according to the invention, enlarged to a molecular level.

As the examples of a substrate used for the invention, substrates having hydrophilic surfaces—metals such as Al, Cu, stainless steel or the like, glass, ceramics, paper, fiber, leather or other hydrophilic substrates—are included. In the case that a material, such as plastic, does not have a hydroxyl group on its surface, the hydroxyl groups can be introduced to the surface by a corona treatment of 100 W for 20 minutes in a plasma atmosphere, containing oxygen, thus the surface becomes hydrophilic. However, in case of polyamide or polyurethane resin, which have imino groups (>NH) on their surfaces, such treatment is not necessary; a dehydrochlorination reaction is promoted between the hydrogens of the imino groups (>NH) of the substrate and the chlorosilyl groups (—SiCl) of a chemical adsorbent, thereby forming a siloxane bond (—SiO—).

As a chlorosilane-based adsorbent comprising numerous chlorosilyl groups in the molecule used for forming an inner layer of the invention having numerous chlorosilyl groups, $SiCl_4$, $SiHCl_3$, $SiH_2Cl_2$, $Cl(SiCl_2O)_n$-$SiCl_3$ (n as an integer) or the like are useful.

It is particularly preferable that $SiCl_4$, which has small molecules and is highly reactive to hydroxyl groups, is used to make a substrate surface uniformly hydrophilic.

It is preferable that gas containing no water such as dry air below 35% relative humidity, nitrogen gas or the like is used as a dry atmosphere.

The concentration of the chlorosilane-based adsorbent having chlorosilyl groups should be about 0.01–100% by weight (most preferably around 0.1–50% by weight).

A polysiloxane film can be formed as follows:

spraying the chlorosilane-based adsorbent having chlorosilyl groups on a substrate surface in dry atmosphere;

leaving the substrate for about 30 minutes, thereby generating a dehydrochlorination reaction and fixing the material to the substrate surface because of numerous hydrophilic OH groups on the substrate surface;

washing the substrate with a nonaqueous solvent;

reacting the substrate with water, thus removing the excessive material and forming a siloxane-based monomolecular layer (inner layer);

vaporizing the solvent containing the adsorbent.

It is easier to vaporize the solvent with a low boiling point; however, in considering the handling of the material, the material with a boiling point at 100° C. or higher is preferable.

In forming an outer layer, a hydrocarbon-based adsorbent comprising chlorosilyl groups or a fluorocarbon-based adsorbent can be used for reaction with the hydroxyl groups (—OH) numerously contained on the surface of inner layer. In the case that a substrate surface is highly hydrophilic, it is not necessary to form an inner layer on the substrate surface. Thus, an outer layer can be deposited on the substrate surface directly.

A solution comprising a compound having chlorosilyl groups—e.g., a hydrocarbon-based adsorbent, a fluorocarbon-based adsorbent or the adsorbent having straight siloxane chain—is applied to deposit an outer layer on the inner layer. (The concentration of the compound in the solution varies depending on the kinds of the solvent and the adsorbent used for the solvent; however, it is preferably 0.1–10% by weight.) A dehydrochlorination reaction is generated at the substrate surface containing numerous hydrophilic OH groups, after coating the substrate with the solution and leaving it for about 30 minutes. The hydrocarbon-based adsorbent or the fluorocarbon-based adsorbent is then fixed to the surface. A monomolecular layer (outer layer) is formed by washing the substrate thoroughly with nonaqueous solvent to remove excessive adsorbent and reacting the substrate with water. It is desirable that the boiling point of the solution is significantly high for extending the time for vaporization and adsorption reaction. In considering the handling of the solution, the boiling point is preferably 100°–300° C. A polymer film of the hydrocarbon-based or fluorocarbon-based adsorbent can be formed by vaporizing the applied solution. (The procedure of washing the substrate with nonaqueous solvent after the adsorption of the hydrocarbon-based or fluorocarbon-based adsorbent is skipped.)

The polymer layer is also formed by a dehydrochlorination reaction. The vaporization of the solution containing the adsorbent comprising chlorosilyl groups can be done fast if the boiling point of the solution is low. However, in considering the handling of the solution, the boiling point is preferably between room temperature and 100° C.

As an adsorbent forming an outer layer, a compound comprising fluorocarbon and chlorosilane groups can be included.

Especially the following compound is preferable to provide an excellent water and oil repelling, anti-contaminating and lubricating properties to the layer:

$CF_3(CF_2)_n(R)_mSiX_pCl_{3-p}$, wherein n represents 0 or an integer, preferably an integer from 1 to 22; R represents an alkyl, phenyl, ethynyl group or a substituent comprising a silicon or oxygen atom; m represents 0 or 1; X represents H, an alkyl, alkoxyl group or a substituent comprising a fluoroalkyl or fluoroalkoxy group; p represents 0, 1 or 2.

The following hydrocarbon-based or siloxane-based chemical adsorbents can be used for forming an outer layer:

$CH_3(CH_2)_rSiX_pCl_{3-p}$;
$CH_3(CH_2)_rSiX_pCl_{3-p}$,
$CH_3(CH_2)_sO(CH_2)_tSiX_pCl_{3-p}$;
$CH_3(CH_2)_uSi(CH_3)_2(CH_2)_vSiX_pCl_{3-p}$;
$CF_3COO(CH_2)_wSiX_pCl_{3-p}$;
$CH_3\{Si(CH_3)_2\}_rSiX_pCl_{3-p}$;
$Cl\{Si(CH_3)_2O\}_rSiX_pCl_{3-p}$ (preferably r is 1 to 25, s is 0 to 12, t is 1 to 20, u is 0 to 12, v is 1 to 20 and w is 1 to 25.)

In addition, the following shows the specific examples of the adsorbents:

$CH_3CH_2O(CH_2)_{15}SiCl_3$;
$CH_3(CH_2)_2Si(CH_3)_2(CH_2)_{15}SiCl_3$;
$CH_3(CH_2)_6Si(CH_3)_2(CH_2)_9SiCl_3$;
$CH_3COO(CH_2)_{15}SiCl_3$;
$CF_3(CF_2)_7(CH_2)_2SiCl_3$;
$CF_3(CF_2)_5(CH_2)_2SiCl_3$;
$CF_3(CF_2)_7C_6H_6SiCl_3$;
$CH_3\{SiCH_3)_2O\}_3SiCl_3$;
$Cl\{Si(CH_3)_2O\}_3Si(CH_3)_2Cl$.

In the case that a substrate is metallic, an alkylthiol including $CH_3(CH_2)_nSH$, $F(CF_2)_n(CH_2)_mSH$, $CF_3(CF_2)_m(CH_2)_nSH$ (wherein m, n=an integer from 1 to 18) or the like can be used as an adsorbent.

The micro liquid drops of nonaqueous solution comprising a chlorosilane compound (or thiol compound) can be provided by a spray gun.

In case of using a chlorosilane-based surface active agent, a nonaqueous organic solvent with no active hydrogen can be used as the solvent for the invention.

Such solvent includes the following:

hexadecane; isooctane; toluene; xylene; cyclohexane; tetralin; petroleum ether; chloroform; carbon tetrachloride; perfluorocarbon; perfluoroalkyl tertiary amine; perfluoroalkyl cyclic ether.

In case of using an alkylthiol, in addition to nonaqueous solvents, an alcohol-based solvent such as ethanol can be used. It is also necessary to choose an adsorbent which does not melt a substrate.

It is required to oxidize the surface of a substrate with no active hydrogen (e.g., hydroxyl, amino, carboxyl groups or the like) such as fiber and polymers, thus providing active groups on the substrate surface before the adsorption reaction. An oxygen plasma treatment, a UV/ozone treatment, a corona treatment, a method of dipping and holding in a mixed solution of concentrated sulphuric acid and potassium dichromate (chromic acid mixture treatment) or the like are included as the methods of oxidizing a substrate surface.

To form a highly dense chemically adsorbed film of thiol compound on the surface of a metal, it is preferable that an oxide on the surface is removed by an electrolysis or acid-alkali solution treatment.

This invention can be applicable for various uses and materials as described in the following:

(a) examples of substrates—metal, ceramics, plastic, wood, stone (the invention being applicable even when the substrate surface being coated with paint or the like in advance);

(b) examples of cutlery—kitchen and other knives, scissors, engraver, razor blade, hair clippers, saw, plane, chisel, gimlet, badkin, cutting tools, drill tip, blender blade, juicer blade, flour mill blade, lawn mower blade, punch, straw cutter, stapler, blade for can opener, surgical knife or the like;

(c) examples of needles—acupuncture needle, sewing needle, sewing-machine needle, long thick needle for making tatami, syringe needle, surgical needle, safety pin or the like;

(d) examples of products in the pottery industry—products made of pottery, glass, ceramics or enameled products, including hygienic potteries (such as a chamber pot, wash-bowl, bathtub, etc.), tableware (such as a rice bowl, plate, bowl, teacup, glass, bottle, coffee-pot, pots and pans, earthenware mortar, cup, etc.), flower vases (such as a flower bowl, flowerpot, small flower vase, etc.), water tanks (such as a breeding cistern, aquarium water tank, etc.), chemistry apparatus (such as a beaker, reacter vessel, test tube, flask, culture dish, condenser, stirring rod, stirrer, mortar, vat, syringe), roof tile, tile, enameled tableware, enameled wash bowl, and enameled pot s and pans;

(e) examples of mirrors—hand mirror, full-length mirror, bathroom mirror, washroom mirror, mirrors for automobile (back and side mirrors), half mirror, mirror for show window, mirrors for department store or the like;

(f) examples of molding parts—die for press molding, die for cast molding, die for injection molding, die for transfer molding, die for vacuum molding, die for blow forming, die for extrusion molding, die for inflation molding, die for fiber spinning, calender processing roll;

(g) examples of ornaments—watch, jewelry, pearl, sapphire, ruby, emerald, garnet, cat's-eye, diamond, topaz, bloodstone, aquamarine, turquoise, agate, marble, amethyst, cameo, opal, crystal, glass, ring, bracelet, brooch, tie pin, earrings, necklace, glasses frames (of platinum, gold, silver, aluminum, titanium, tin, compound metals of these elements, or stainless steel) or the like;

(h) examples of molds for food—cake mold, cookie mold, bread mold, chocolate mold, jelly mold, ice cream mold, oven plate, ice tray or the like;

(i) examples of cookware—pots and pans, iron pot, kettle, pot, frying pan, hot plate, net for grilling food, tool for draining off oil, plate for making takoyaki or the like;

(j) examples of paper—photogravure paper, water and oil repellent paper, paper for posters, high-quality paper for pamphlets or the like;

(k) examples of resin—polyolefin (such as polypropylene, polyethylene, etc. ), polyvinylchloride, polyvinylidenechloride, polyamide, polyimide, polyamideimide, polyester, aromatic polyester, polystyrene, polysulfone, polyethersulfone, polyphenylenesulfinde, phenolic resin, furan resin, urea resin, epoxide, polyurethane, silicon resin, ABS resin, methacrylic resin, ethylacrylate resin, ester resin, polyacetal, polyphenyleneoxide or the like;

(l) examples of household electric goods—television, radio, tape recorder, audio goods, CD player, refrigerator, freezer, air conditioner, juicer, blender, blade of an electric fan, lighting equipment, dial plate, hair drier for perm or the like;

(m) examples of sporting goods—skis, fishing rod, pole for pole vault, boat, sailboat, jet skis, surfboard, golf ball, bowling ball, fishing line, fishing net, fishing float or the like:

(n) examples of vehicle parts;

(1) ABS resin—lamp cover, instrument panel, trimming parts, and protector for a motorcycle, (2) cellulose plastic—markings for automobile, and steering wheel, (3) FRP (Fiber Reinforced Plastics)—bumper, and engine cover, (4) phenolic resin—brake, (5) polyacetal—wiper, wiper gear, gas valve, carburetor parts, (6) polyamide—radiator fan, (7) polyarylate (polycondensation polymerization by bisphenol A and pseudo phthalic acid)—direction indicator lamp (or lens), cowl board lens, relay case, (8) polybutylene terephthalate—rear end, front fender, (9) poly amino-bismaleimide—engine parts, gear box, wheel, suspension drive system,

(10) methacrylate resin—lamp cover lens, meter panel and cover, and center mark,

(11) polypropylene—bumper,

(12) polyphenylene oxide—radiator grill, wheel cap,

(13) polyurethane—bumper, fender, instrument panel, and fan,

(14) unsaturated polyester resin—body, gas tank, heater housing, meter panel, (o) examples of stationary goods—fountain pen, ballpoint pen, mechanical pencil, pencil case, binder, desk, chair, book shelf, rack, telephone base, ruler, draftsman's outfit or the like;

(p) examples of building materials—roof materials (such as ceramic tile, slate, tin such as used in galvanized iron plate, etc.), outer wall materials (such as wood including processed wood, mortar, concrete, ceramic sizing, metallic sizing, brick, building stone, plastic material, metallic material including aluminum, etc.), interior materials (such as wood including processes wood, metallic material including aluminum, plastic material, paper, fiber, etc.) or the like;

(q) examples of stone materials—granite, marble or the like, used for building, building material, works of art, ornament, bath, gravestone, monument, gatepost, stone wall, sidewalk, paving stone, etc.

(r) examples of musical instruments and audio apparatus percussion instruments, string instruments, keyboard instruments, woodwind instruments, brass instruments or the like, more specifically, drum, cymbals, violin, cello, guitar, koto, piano, flute, clarinet, shakuhachi, horn, etc., and microphone, speaker, earphone or the like.

(s) others—high voltage insulator with good water, oil and contamination-repelling properties, including thermos bottles, vacuum apparatus, insulator for transmitting electricity, spark plugs or the like.

A method of manufacturing a chemically adsorbed film of the invention will now be explained specifically in the following examples 1-11.

Example 1

Figure 2:
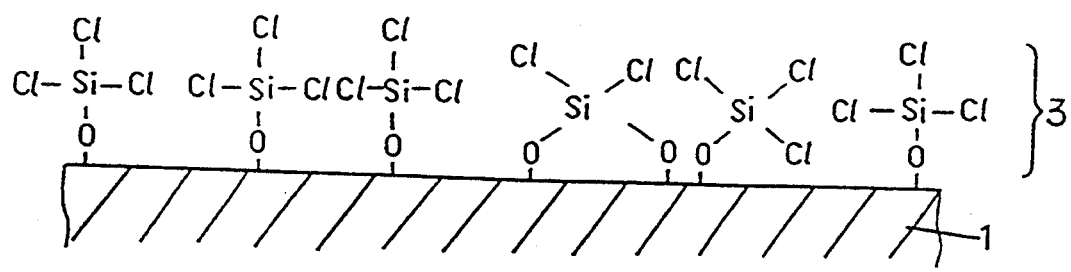
FIG. 2 is a sectional view of a substrate surface formed with a chlorosilane-based monomolecular layer of the example according to the invention, enlarged to a molecular level.

An aluminum substrate 1 was used in this example (FIG. 1). Since a few hydrophilic —OH groups are exposed on the surface of aluminum substrate 1, $SiCl_4$ (tetrachlorosilane) comprising numerous chlorosilyl groups in the molecule was used as an adsorbent for forming an inner layer. A solution was prepared by dissolving 5% by weight of tetrachlorosilane, 85% by weight of hexadecane, and 10% by weight of chloroform. (Instead of hexadecane, any nonorganic solvent with a boiling point 100° C. or above, such as xylene, tetralin or the like, can be applicable.) After spraying the solution on the surface of aluminum substrate 1 in a dry nitrogen atmosphere, the substrate was left for about 30 minutes. As a result, a dehydrochlorination reaction was generated at the substrate surface as shown in FIG. 2, and the molecules were bonded to the surface via —SiO— bonds as in the following Formula 1 and/or Formula 2. Hexadecane with its boiling point at 287° C. was hardly vaporized in the above-noted procedures.

Formula 1

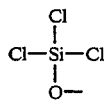

Formula 2

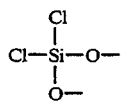

Figure 3:
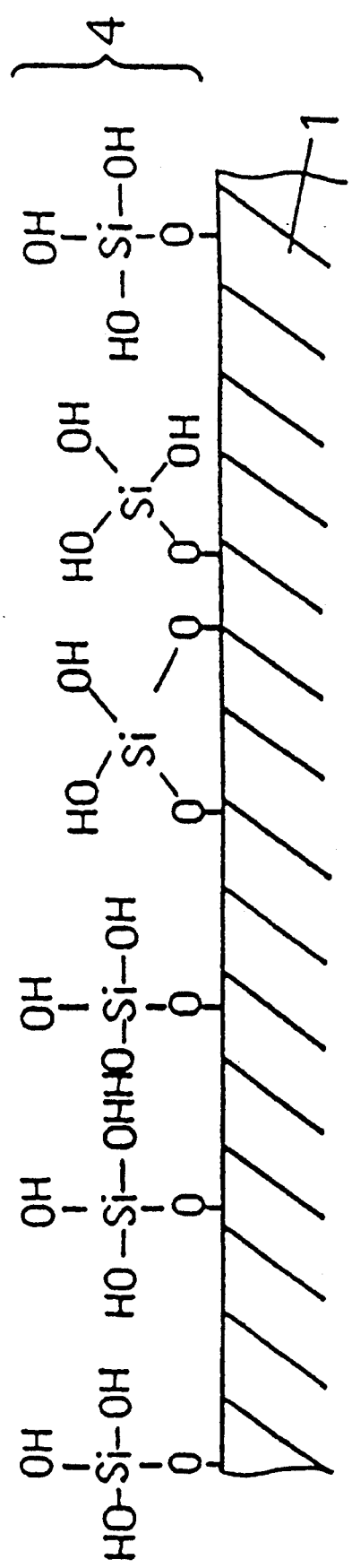
FIG. 3 is a sectional view of a substrate surface formed with a siloxane-based monomolecular inner layer having numerous silanol groups of the example according to the invention, enlarged to a molecular level.

The unreacted $SiCl_4$ molecules were removed by washing aluminum substrate 1 with a nonaqueous solvent like chloroform and then with water. As shown in the following formulas, a siloxane monomolecular layer 4 comprising numerous silanol groups was formed on the substrate surface after the reaction between the adsorbed solution and water (FIG. 3).

Formula 3

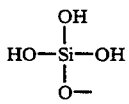

Formula 4

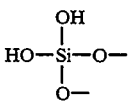

Siloxane monomolecular layer 4 or a polysiloxane inner layer bonded to aluminum substrate 1 via —SiO— could not be peeled off. Siloxane monomolecular layer 4 or the polysiloxane inner layer formed by the reaction comprised numerous SiOH bonds on the surface, and the number of hydroxyl groups was increased to about three times the original number of the groups on substrate 1.

Figure 4:
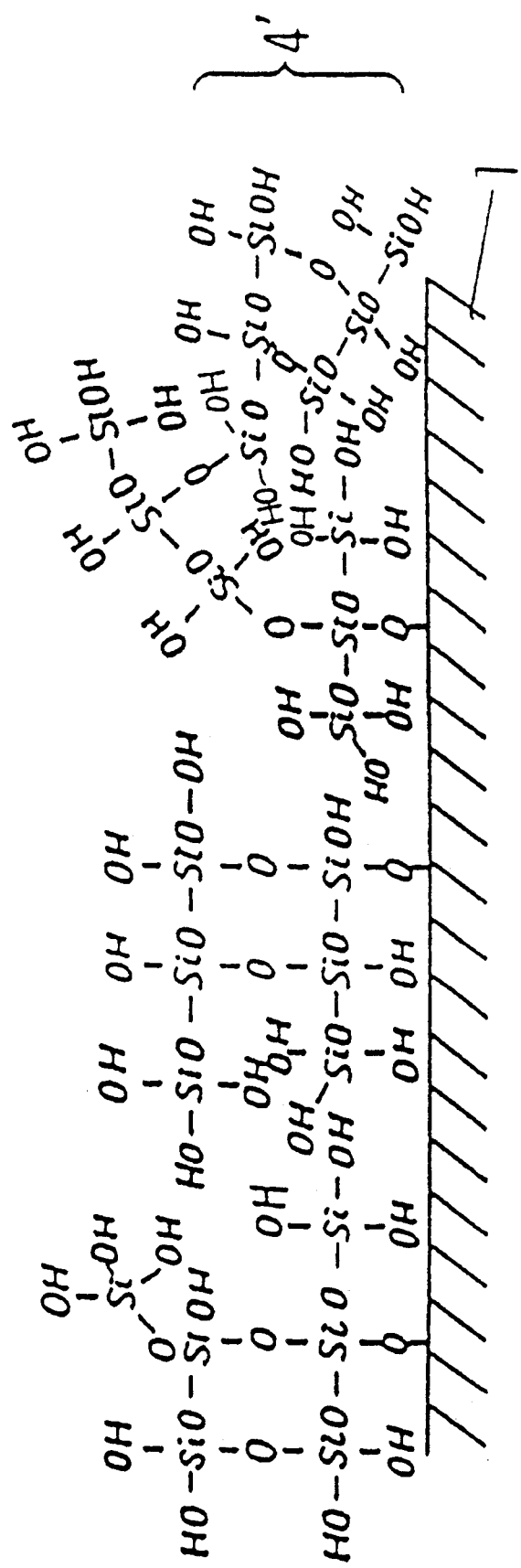
FIG. 4 is a sectional view of a substrate surface formed with a polysiloxane inner layer having numerous silanol groups of the example according to the invention, enlarged to a molecular level.

Moreover, a polysiloxane layer 4' comprising numerous silanol groups was formed after spraying the solvent comprising tetrachlorosilane, in this example cyclohexane (bp. 80° C.), and naturally vaporizing the solvent (FIG. 4). (In the above-noted procedure, the step of washing the substrate with a nonaqueous solvent after spraying the solvent was skipped.) Besides cyclohexane, any nonaqueous solvent with a boiling point around 100° C. or below capable of dissolving tetrachlorosilane including n-hexane, such as "FLORINATE" (Trade Name: manufactured by 3M) or the like can be used as the solvent in this example.

Figure 5:
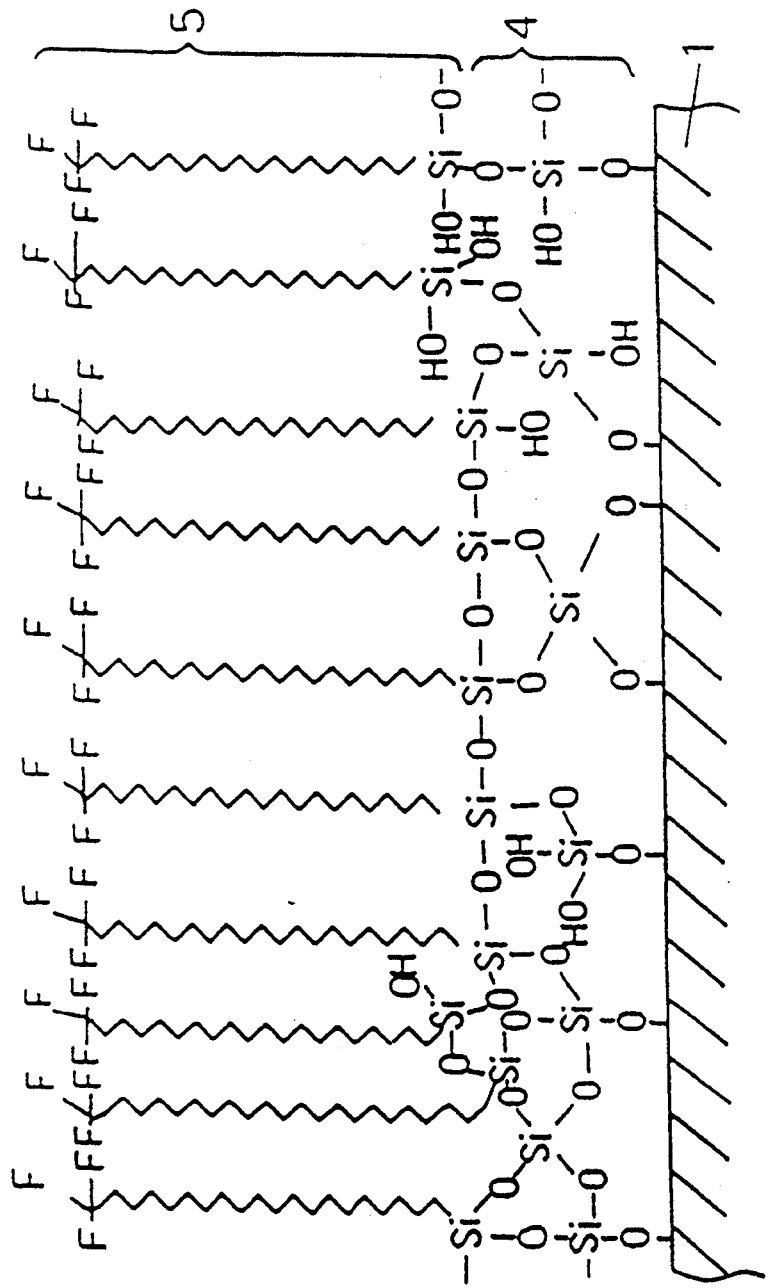
FIG. 5 is a sectional view of a fluorine-based chemically adsorbed monomolecular layer formed on a siloxane-based monomolecular inner layer of the example according to the invention, enlarged to a molecular level.

A outer layer, furthermore, was formed in a dry nitrogen atmosphere as follows:

spraying a solution mixed of 5% by weight of a chemical adsorbent comprising fluorocarbon and chlorosilane groups, $CF_3(CF_2)_7(CH_2)_2SiCl_3$ in this example, 85% by weight of hexadecane and 10% by weight of chloroform on aluminum substrate 1 in a dry nitrogen atmosphere; letting the substrate sit for about 30 minutes; washing the substrate with a nonaqueous solvent, thus removing the unreacted $CF_3(CF_2)_7(CH_2)_2SiCl_3$ molecules;

exposing the substrate to air;

reacting the adsorbed chemical adsorbent with water in air, thereby forming the bonds as in the following formula 5 on the siloxane monomolecular layer (FIG. 5).

Formula 5

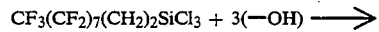

A monomolecular layer 5 formed on siloxane monomolecular layer 4 is shown in FIG. 5. As seen from FIG. 5, the monomolecular layer 5 comprising fluorine was formed on siloxane monomolecular layer 4 (inner layer) by chemical bonding (covalent bonding).

Figure 6:
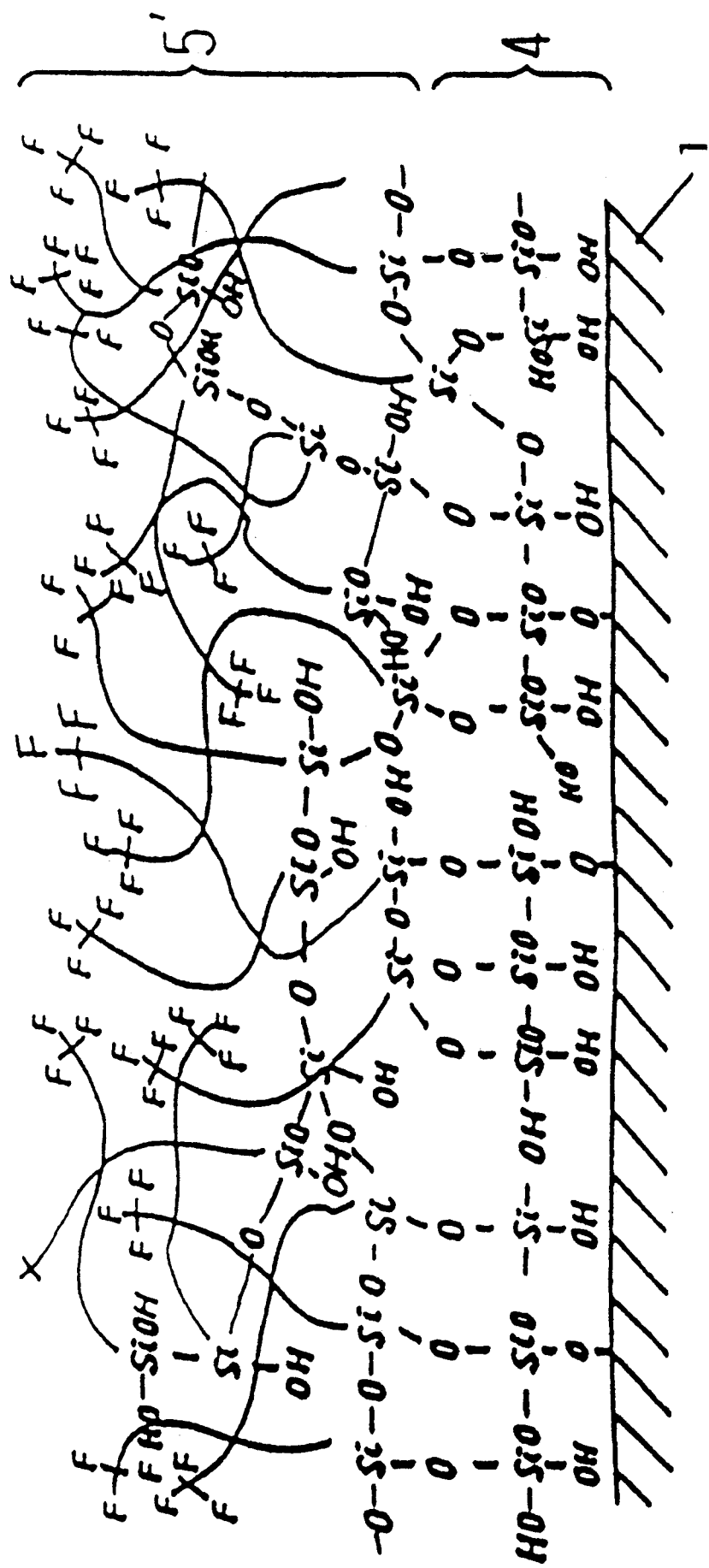
FIG. 6 is a sectional view of a fluorine-based polymer layer formed on a siloxane-based monomolecular inner layer of the example according to the invention, enlarged to a molecular level.
Figure 7:
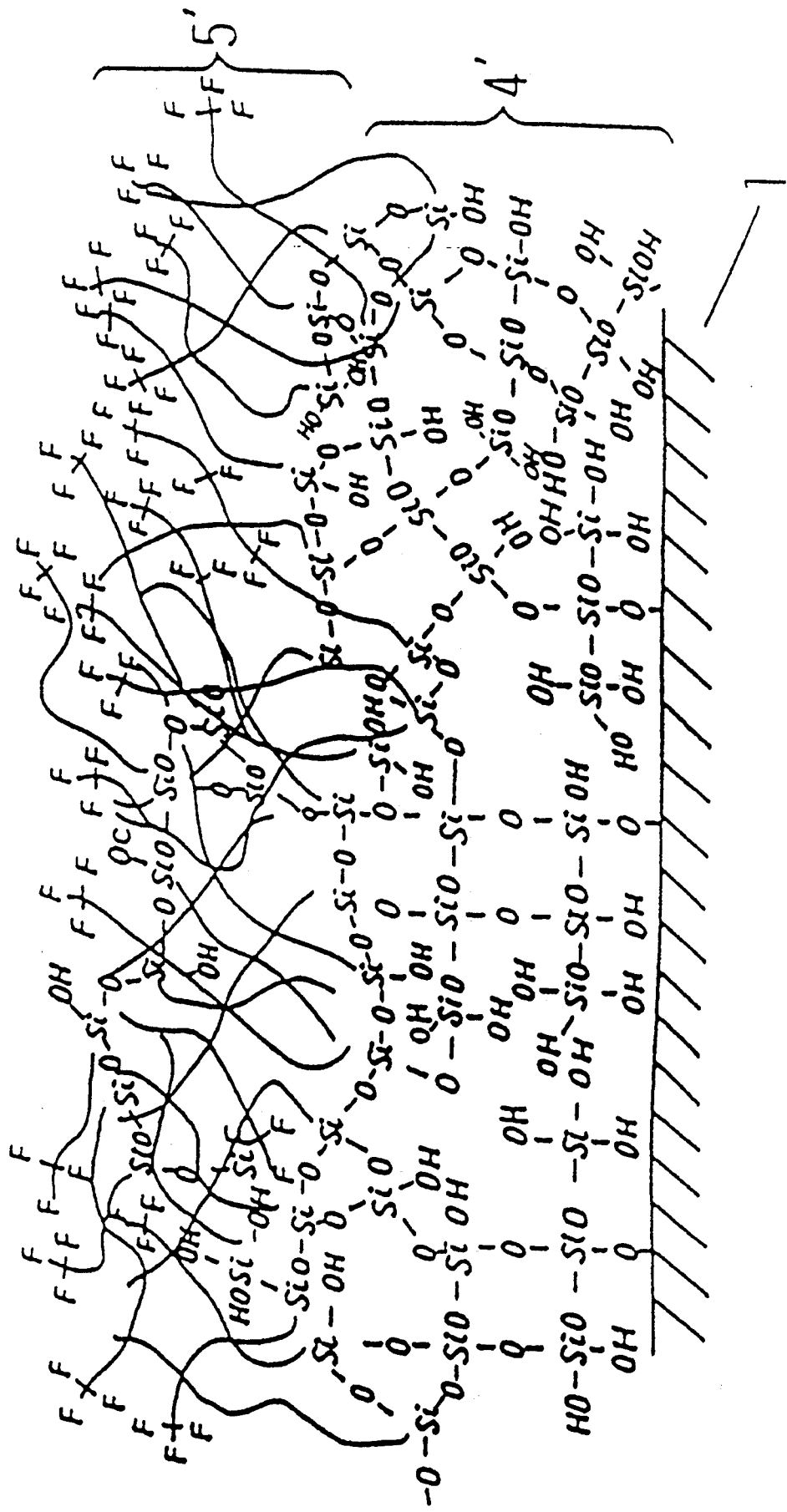
FIG. 7 is a sectional view of a fluorine-based chemically adsorbed polymer layer formed on a polysiloxane inner layer of the example according to the invention, enlarged to a molecular level.

As a solvent comprising $CF_3(CF_2)_7(CH_2)_2SiCl_3$, cyclohexane (bp. 80° C.) was used. (Any nonaqueous solvent with a boiling point at 100° C. or below capable of dissolving tetrachlorosilane such as n-hexane, "FLORINATE" (Trade Name, 3M) can be used.) By naturally vaporizing the solvent, a fluorocarbon-based polymer layer 5' was formed either on siloxane monomolecular layer 4 (FIG. 6) or polysiloxane layer 4' (FIG. 7). (The procedure of washing the substrate with a nonaqueous solvent after spraying the solvent was skipped.)

The monomolecular or polymer outer layer was not peeled off by a cross-cut adhesion test.

Although $CF_3(CF_2)_7(CH_2)_2SiCl_3$ was used as a fluorocarbon-based adsorbent for forming an outer layer in the example, the firmness of the monomolecular layer can be further improved by adding vinyl or ethynyl groups into an alkyl chain and crosslinking the film with an electron beam irradiation of about 5 Mrads.

Furthermore, this invention is not limited to a fluorine-based adsorbent, and an ultra thin hydrocarbon-based film with mechanical strength can be also applicable.

In case of using a glass with its surface containing numerous OH groups as a substrate, a fluorocarbon-based monomolecular or fluorocarbon-based polymer layer can be directly formed on the substrate surface while skipping the procedure of forming a siloxane monomolecular or polysiloxane layer.

Example 2

Figure 8:
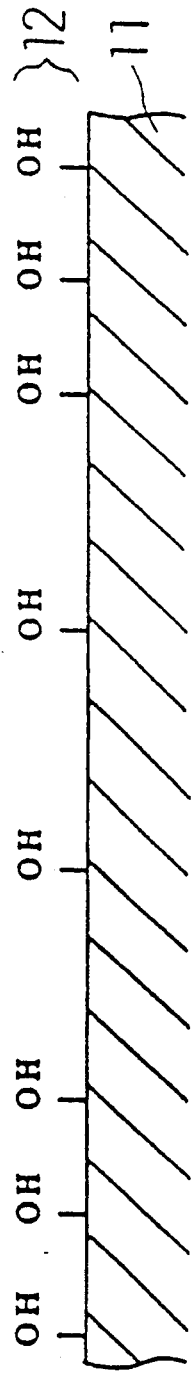
FIG. 8 is a sectional view of a substrate surface, enlarged to a molecular level, showing another example according to the invention.

As shown in FIG. 8, a back mirror 11 made of an acrylic acid resin as a transparent element was used. Since the surface of the acrylic acid resin is water repellent, it was made hydrophilic by treatment of 100 W in a plasma atmosphere comprising oxygen for 20 minutes. The hydrophilic surface contained a few hydroxyl groups 12 (FIG. 8); therefore, octachlorosiloxane (Formula 6) comprising chlorosilyl groups was used as an adsorbent for forming an inner layer.

Formula 6

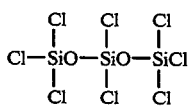

A chlorosilane monomolecular layer 13 shown in FIG. 9 was formed in the following procedures:

preparing a solution by dissolving 10% by weight of the adsorbent (Formula 6) in a nonaqueous solvent, xylene;

spraying the solution on the surface of back mirror 11 in a dry air (below 35% relative humidity);

letting the substrate sit for about 20 minutes, generating a dehydrochlorination reaction because of hydrophilic OH groups 12 on the surface;

washing away the solution left on the substrate surface with Freon 113.

Figure 9:
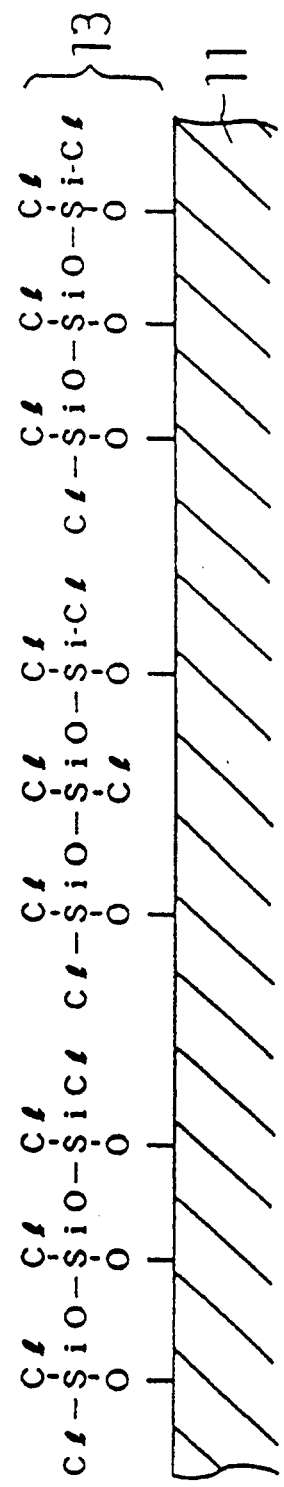
FIG. 9 is a sectional view of a substrate surface formed with a chlorosilane-based monomolecular layer of the example according to the invention before reacting the surface with water, enlarged to a molecular level.

Even though a few hydrophilic OH groups were contained on the surface of back mirror 11, a dehydrochlorination reaction was generated, and as in the following formula 7 and/or formula 8, the chlorosilane-based molecules were fixed to the substrate surface via —SiO— bonds (FIG. 9).

Formula 7

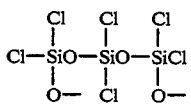

Formula 8

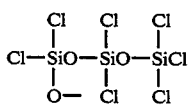

Figure 10:
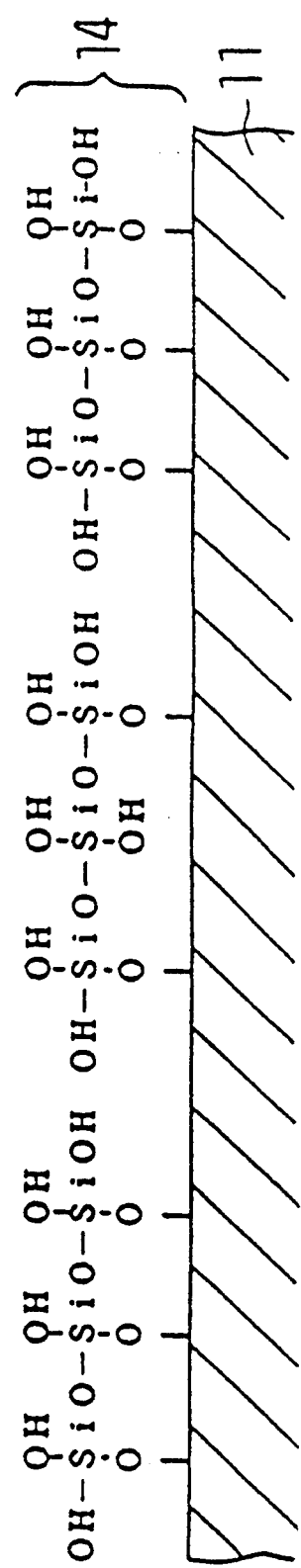
FIG. 10 is a sectional view of a substrate surface formed with a siloxane-based monomolecular inner layer of the example according to the invention, enlarged to a molecular level.

A siloxane monomolecular layer 14 as shown in the following formulas 9 and/or 10 was formed on the surface of back mirror 11 after washing the mirror with Freon and then water (FIG. 10).

Formula 9

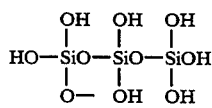

Formula 10

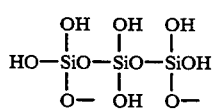

By skipping the procedure of washing the substrate with the Freon solvent and vaporizing the xylene completely, a polysiloxane layer was also formed. Siloxane monomolecular layer 14 or the polysiloxane layer covalently bonded to the surface of back mirror via —SiO— was not peeled off. Siloxane monomolecular layer 14, in addition, had numerous —SiOH bonds on the surface. The number of hydroxyl groups was about seven times more than the number of groups contained on the substrate surface before the reaction.

Figure 11:
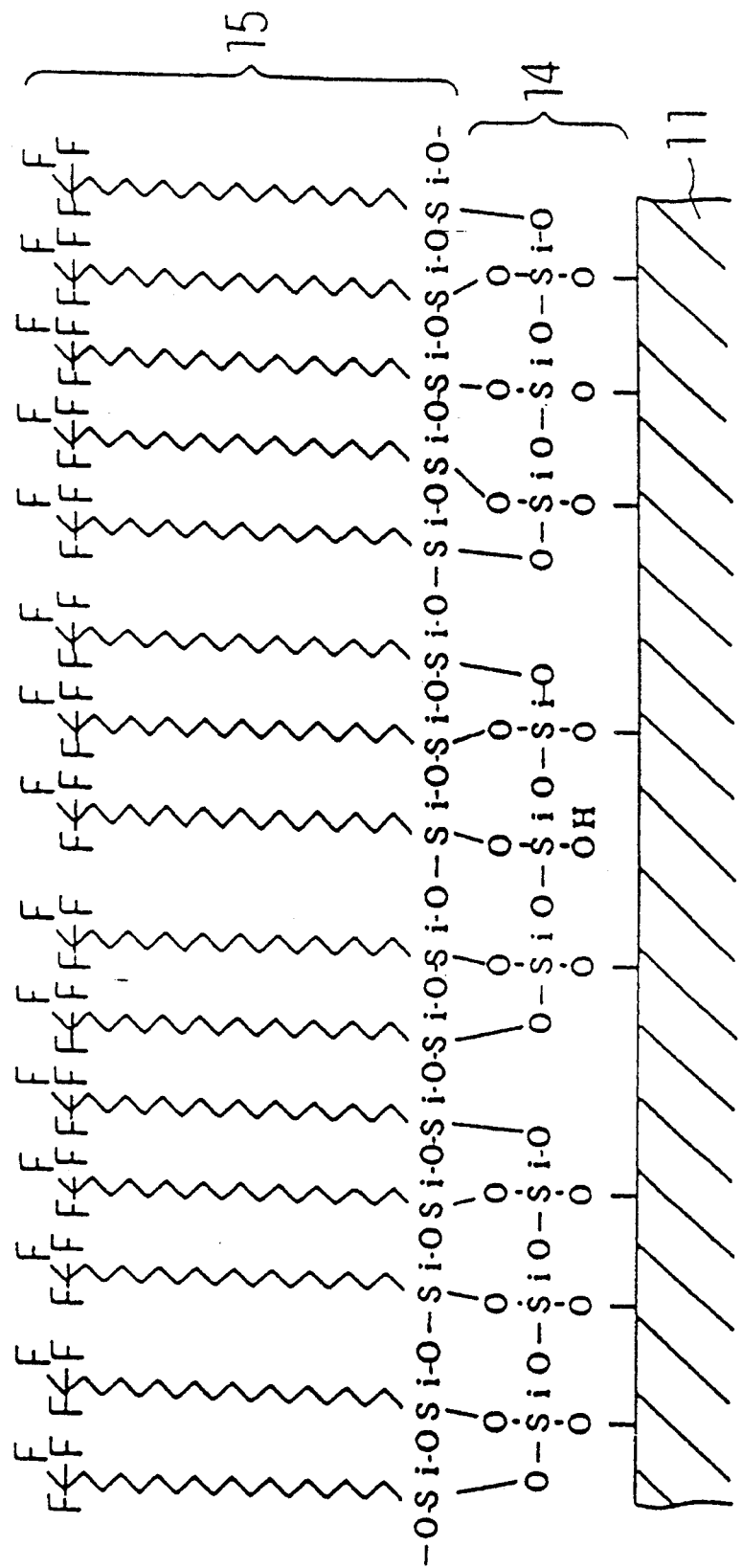
FIG. 11 is a sectional view of a fluorocarbon-based monomolecular outer layer formed on a siloxane-based monomolecular layer of the example according to the invention, enlarged to a molecular level.

A chemically adsorbed monomolecular outer layer was formed on siloxane monomolecular layer 14 as follows:

spraying a xylene solution, dissolved about 2% by weight of $CF_3(CF_2)_7(CH_2)_2SiCl_3$, on the surface of back mirror 11 formed with siloxane monomolecular layer 14 or the polysiloxane layer in a dry air (below 35% relative humidity);

letting the substrate sit for about 10 minutes, thus forming the bonds as in Formula 5 on the surface of siloxane monomolecular layer 14 or the polysiloxane layer and chemically bonding a chemically adsorbed monomolecular layer 15 comprising fluorine with about 1.5 nm uniform thickness on the substrate (FIG. 11).

A fluorocarbon-based polymer layer was also formed by skipping the procedure of washing the substrate with nonaqueous solvent and leaving the substrate for about one hour to vaporize xylene.

Chemically adsorbed monomolecular layer 15 or the polymer layer were not peeled off by a peel test. In testing the back mirror of the invention, only a water drop about 2 mm in diameter adhered because of the water repelling effect of fluorine contained in the chemically adsorbed film on the surface of the mirror. Moreover, in assuming contact of hair to the mirror, a hair tonic was adhered for an experiment. The tonic, however, was repelled, and the mirror was not clouded due to the oil repelling effect of fluorine contained in the film formed on the surface of the mirror.

Example 3

An experiment similar to Example 2 was conducted in this example, except that the acrylic acid resin was replaced with a polycarbonate resin and that the heptadecafluorodecyl trichlorosilane was replaced with tridecafluorooctyl trichlorosilane ($CF_3(CF_2)_5(CH_2)_2SiCl_3$).

Example 4

An experiment similar to Example 1 was conducted in this example, except that the acrylic acid resin was replaced with a polypropylene resin and that the heptadecafluorooctyl trichlorosilane was replaced with perfluorodecyl trichlorosilane.

Example 5

An experiment similar to Example 2 was conducted in this example, except that the acrylic acid resin was replaced with an ABS resin.

Example 6

An experiment similar to Example 2 was conducted in this example, except that the acrylic acid resin was replaced with an epoxy resin.

Example 7

An experiment similar to Example 2 was conducted in this example, except that the acrylic acid resin was replaced with a polyurethane resin.

Example 8

An experiment similar to Example 2 was conducted in this example, except that the acrylic acid resin was replaced with a butadiene-styrene rubber resin.

Example 9

An experiment similar to Example 2 was conducted in this example, except that the acrylic acid resin was replaced with a butyl rubber resin.

Example 10

An experiment similar to Example 2 was conducted in this example, expect that the acrylic acid resin was replaced with a nitrile rubber resin.

Example 11

An experiment similar to Example 2 was conducted in this example, except that the heptadecafluorodecyl trichlorosilane was replaced with 18-nonadecenyl trichlorosilane and that the substrate was irradiated with an electron beam of 0.02 Mrad/s and 300 keV in a nitrogen atmosphere for one minute after the formation of the chemically adsorbed monomolecular film.

Example 12

An experiment similar to Example 2 was conducted in this example, except that the octachlorosiloxane was replaced with tetrachlorosilane.

Reference 1

After coating metanol solution dissolving 2% by weight of a silane coupling agent (heptadecafluorodecyl trimethoxysilane) on the surface of polycarbonate resin, the substrate was dried at the temperature of 120° C. for one hour.

Reference 2

A chemically adsorbed monomolecular film of heptadecafluorodecyl trichlorosilane was formed by skipping the oxidation treatment of the acrylic acid resin mirror of Example 2.

Reference 3

The suspension of polytetrafluoroethylene was sprayed on the surface of acrylic acid resin mirror of Example 2, and the substrate was dried at the temperature 60° C. for one hour.

The contact angles of pure water and oil (salad oil produced by Nisshin Co., Inc.) on the substrates of Examples 1-13 and References 1-2 were measured. The measurements of the contact angles were directed right after the formation of a chemically adsorbed film or a coating film and after rubbing the substrates with a cloth wet with water a total of 10,000 times. The results are shown in Table 1.

TABLE 1

| | Contact Angle of Water (°) | | Contact Angle of Oil (°) | |
|---|---|---|---|---|
| | Initial Number | After Rubbing Test | Initial Number | After Rubbing Test |
| Example 1 | 120 | 118 | 97 | 94 |
| Example 2 | 115 | 114 | 92 | 90 |
| Example 3 | 112 | 111 | 93 | 92 |
| Example 4 | 113 | 111 | 94 | 91 |
| Example 5 | 110 | 110 | 94 | 94 |
| Example 6 | 111 | 113 | 94 | 92 |
| Example 7 | 112 | 108 | 93 | 89 |
| Example 8 | 111 | 111 | 93 | 91 |
| Example 9 | 112 | 112 | 95 | 90 |
| Example 10 | 111 | 109 | 90 | 90 |
| Example 11 | 108 | 107 | 92 | 85 |
| Example 12 | 105 | 101 | 88 | 83 |
| Reference 1 | 96 | 45 | 65 | 11 |
| Reference 2 | 48 | 48 | 12 | 12 |
| Reference 3 | 110 | 55 | 90 | 18 |

As clearly seen from Table 1, even after the rubbing tests, the substrates of the invention kept their water and oil repelling and hydrophilic properties. In Reference 1, however, the water and oil repelling properties were reduced significantly. In case of skipping the oxidation treatment as in Reference 2, a chemically adsorbed hard film comprising siloxane bonds might not be formed.

The substrates formed with a chemically adsorbed monomolecular layer comprising fluoroalkyl groups had an excellent anti-contaminating property. After the rubbing test, the substrate of Example 1 was dipped and held in a salad oil, and the oil was easily wiped off with tissue paper. However, in case of the substrate in Reference 1, the surface was still contaminated with the oil after being wiped with tissue paper several times.

This invention can be applicable as an optical material. The light transmittance of the polycarbonate resin of Example 3 was 92%, which was unchanged from the transmittance before the formation of the chemically adsorbed monomolecular layer. The transmittance of the sample in Reference 3 coated with polytetrafluoroethylene was reduced to below 50%, and the transparency of the film was significantly lost.

Example 14

Cyclohexane-based adsorbent comprising numerous chlorosilyl groups such as $SiCl_4$, $SiHCl_3$, $SiH_2Cl_2$, $Cl(SiCl_2O)_nSiCl_3$ (n as an integer) or the like (preferably $SiCl_4$ with small molecules, highly reactive to hydroxyl groups and capable of making the surface of substrate uniformly hydrophilic) was sprayed on iron scissors, which are hydrophilic but contain a few hydroxyl groups. (The material of the scissors can be stainless steel.) The scissors were left for about 30 minutes, and then taken into the air. As a result, a dehydrochlorination reaction was generated because of the hydrophilic OH groups on the surface, and a polysiloxane-based layer comprising silanol bonds was formed after the reaction between the moisture in the air and the substrate.

The polysiloxane-based layer was chemically bonded to the scissors via —SiO— bonds, and the layer would be peeled off only by a decomposition reaction. The number of hydroxyl groups on the surface of the polysiloxane layer was increased by about 10 times compared with the number contained before the reaction.

A chemically adsorbed built-up film was formed in the following procedures:

preparing a chemical adsorption solution containing a nonaqeous solvent and an adsorbent comprising fluorocarbon and chlorosilyl groups—e.g., a mixed solution of 80% by weight of hexadecane, 12% by weight of carbon tetrachloride and 8% by weight of chloroform, containing about 10% by weight of $CF_3(CF_2)_7(CH_2)_2SiCl_3$;

spraying the solution on the scissors;

letting the scissors sit for about one hour;

washing the unreacted material on the scissors with a nonaqueous solution such as chloroform;

reacting the substrate with water or alternatively with the moisture in the air, thus generating the bonds of $CF_3(CF_2)_7(CH_2)_2Si(O—)_3$ on the surface of the polysiloxane layer formed on the surface of the scissors and forming a chemically adsorbed monomolecular layer comprising fluorine over the entire surface of the scissors with the thickness of about 2.0 nm. The built-up film was not peeled off by a peel test.

Example 15

An aluminum kettle, which is hydrophilic but contains a few hydroxyl groups, was used as a substrate. The solution was prepared by dissolving 1% by weight of $SiCl_4$ comprising numerous chlorosilyl groups in a nonaqueous xylene solvent. The solution was sprayed on the surface of the kettle, and the substrate was left for about 20 minutes. Because there are a few hydrophilic OH groups on the surface of the aluminum kettle, a dehydrochlorination reaction was generated at the surface.

The aluminum kettle was then washed with a nonaqueous solvent such as chloroform, and then with water, thus removing $SiCl_4$ molecules unreacted with the kettle. Then, a siloxane monomolecular film such as $Si(OH)_3O—$, $—OSi(OH)_2O—$ or the like was formed on the surface of the aluminum kettle.

The monomolecular layer was chemically bonded to the surface of the kettle via —SiO—, and was not peeled off. The number of the hydroxyl groups on the monomolecular layer, comprising numerous SiOH bonds, was increased by around three times more than the number contained before the reaction.

A chemical adsorption solution containing a nonaqueous solvent and an adsorbent comprising fluorocarbon and chlorosilane groups—e.g., a chloroform solution dissolving about 1% by weight of $CF_3(CF_2)_7(CH_2)_2SiCl_3$—was prepared. The solution was sprayed on the aluminum kettle, and the kettle was left for about an hour at room temperature. The kettle was then reacted with water, or alternatively with the moisture in the air. As a result, the bonds of $CF_3(CF_2)_7(CH_2)_2Si(O—)_3$ were created, and a fluorocarbon-based polymer layer comprising fluorine chemically bonded to the siloxane monomolecular layer was formed with the thickness of around 2.0 nm over the entire surface of the aluminum kettle. The polymer layer was not peeled off by a peel test.

Example 16

The solution, dissolving 15% by weight of $SiCl_4$ comprising numerous chlorosilyl groups in a chloroform solvent, was sprayed on an iron hot plate which is hydrophilic but contains a few hydroxyl groups. The plate was then left for about 30 minutes, and the chloroform was vaporized. Since there were a few hydrophilic OH groups on the surface of the iron hot plate, a dehydrochlorination reaction was created, thus forming —SiO— groups. After washing the plate with water, a polysiloxane film was formed on the plate by the reaction of the unreacted —SiCl and $SiCl_4$ molecules.

The polysiloxane layer was chemically bonded to the surface of the hot plate via —SiO— bonds, and was not peeled off. On the surface of the polysiloxane layer, numerous SiOH bonds were contained.

Furthermore, a nonaqueous solution mixed with the adsorbent comprising fluorocarbon and chlorosilane groups, e.g., Florinate FX3252 (manufactured by 3M) dissolving 5% by weight of $CF_3(CF_2)_7(CH_2)_2SiCl_3$, was sprayed on the surface of the polysiloxane layer comprising numerous SiOH bonds. After leaving the substrate for about one hour, it was reacted with water or the moisture in the air, thus forming the bonds of $CF_3(CF_2)_7(CH_2)_2Si(O—)_3$ on the surface. And a fluorocarbon-based polymer layer was chemically bonded to the polysiloxane layer formed on the surface of the hot plate with the thickness of around 20–30 nm. The polymer layer was not peeled off by a peel test.

Example 17

A fluorocarbon-based monomolecular layer with the thickness of about 1.5 nm was formed on a hydrophilic porcelain teacup in the following procedures:

preparing a chemical adsorption solution containing a nonaqueous solvent and an adsorbent comprising fluorocarbon chains and chlorosilane groups, e.g., a tetralin solution dissolving 5% by weight of $CF_3(CF_2)_5(CH_2)_2SiCl_3$;

spraying the prepared solution on the hydrophilic porcelain teacup by a spray gun;

letting the teacup sit for about one hour;

washing away the unreacted adsorbent with nonaqueous solution such as chloroform or the like;

reacting the teacup with water or alternatively with moisture in the air, thereby generating the bonds of $CF_3(CF_2)_5(CH_2)_2Si(O—)_3$ and forming the monomolecular layer on the entire surface of the teacup.

The monomolecular layer was excellently transparent, and was not peeled off by a peel test.

Example 18

A fluorocarbon-based polymer layer with the thickness of about 10 nm was directly formed on the entire surface of a hydrophilic porcelain plate as follows:

preparing a chemical adsorption solution containing a nonaqueous solvent and an adsorbent comprising fluorocarbon chains and chlorosilane groups, e.g., a chloroform solution dissolving about 5% by weight of $CF_3(CF_2)_5(CH_2)_2SiCl_3$;

spraying the prepared solution on the porcelain plate;

leaving the plate for about one hour and vaporizing the chloroform solution on the plate;

reacting the plate with water or alternatively with the moisture in the air, thus creating the bond of $CF_3(CF_2)_5(CH_2)_2Si(O—)_3$ and forming the polymer layer on the entire surface of the porcelain plate.

The polymer layer was transparent and was not peeled off by a peel test.

According to the above-noted examples, a fluorocarbon-based monomolecular and polymer layer of the invention, which are thin, adherent and pin-hole free, can improve the quality of substrates in need of anti-heat, weather and friction properties, e.g., electric goods such as hot plates and rice steamers, automobiles, industrial equipment, mirrors, lenses for glasses, interior goods, apparel or the like.

In addition, in Examples 1–18, a chemically adsorbed monomolecular or polymer layer can be efficiently manufactured.

Example 19

A cyclohexane solution dissolving 1% by volume of heptadecafluorodecyl trichlorosilane was sprayed on the surface of a glass plate (soda glass: 1 m×2 m×0.5 cm) in a nitrogen atmosphere, and the plate was left for one hour. The plate was then washed with methanol.

Figure 12:
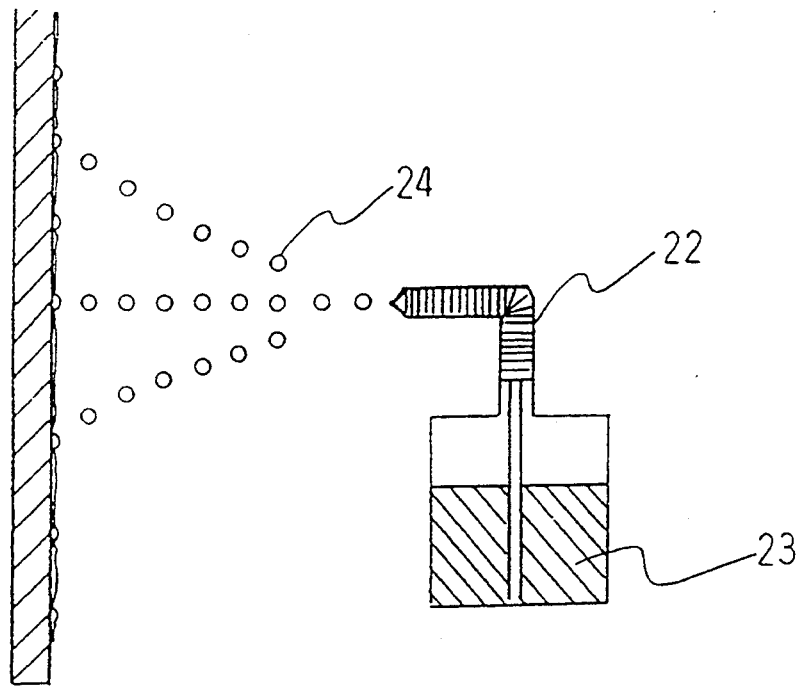
FIG. 12 is a sectional and schematic view of a spray gun used in Example 19 of the invention.
Figure 13:
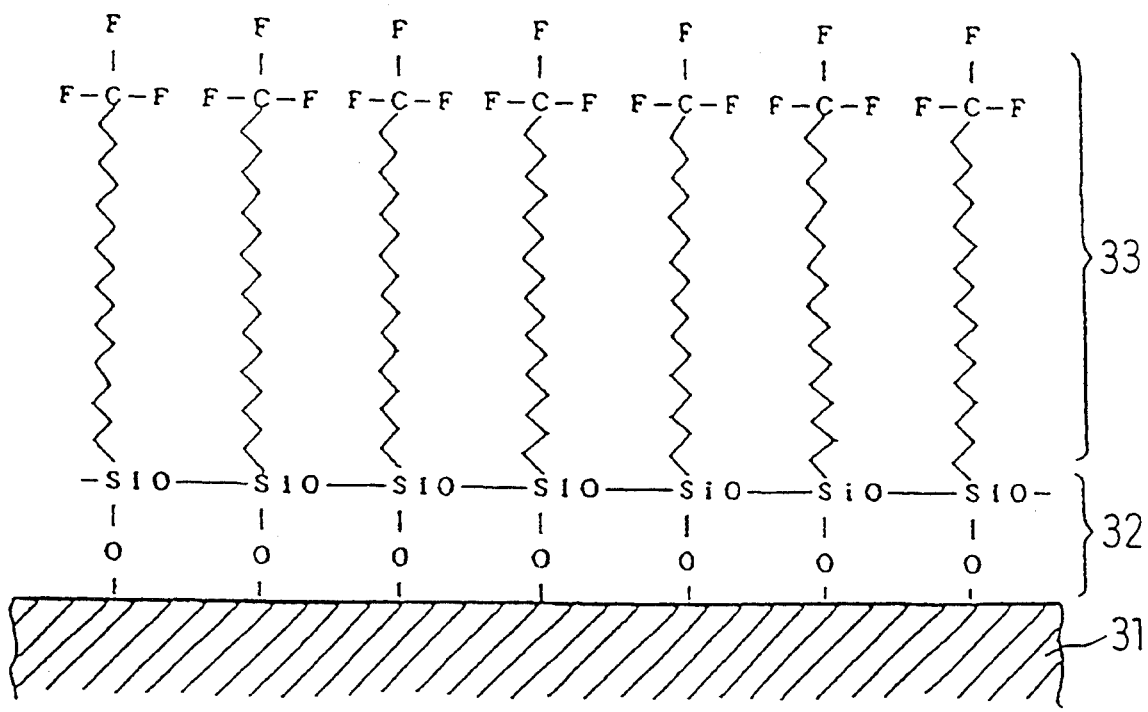
FIG. 13 is a sectional view of a chemically adsorbed monomolecular layer formed in Example 19 of the invention by using a chlorosilane compound having a $CF_3$ group at one end of the molecule, enlarged to a molecular level.
Figure 14:
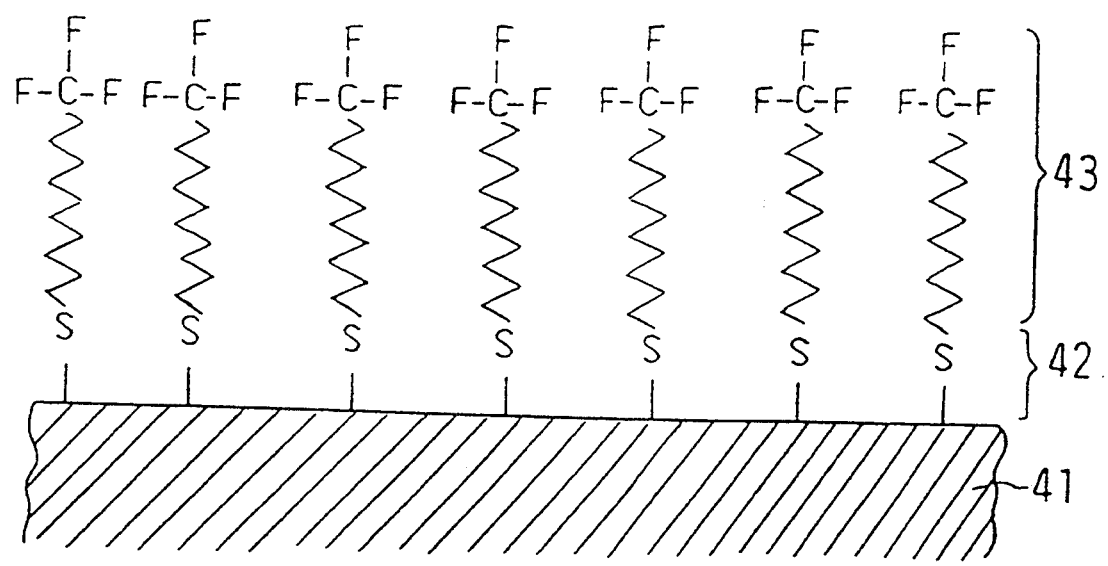
FIG. 14 is a sectional view of a chemically adsorbed monomolecular layer formed in Example 19 of the invention by using a thiol compound, enlarged to a molecular level.

As in FIG. 12, a chemically adsorbed film was formed on a substrate 21 by spraying micro liquid drops 24 of a nonaqueous solution 23 comprising a chlorosilane adsorbent with a spray gun 22. FIG. 13 is a schematic view, enlarged to a molecular level, showing the formation of a chemically adsorbed film 33 on a substrate 31 via siloxane bonds 32. Instead of chlorosilane, thiol was used in case of FIG. 14, and a chemically adsorbed film 43 was formed on a substrate 41 via —S— bonds 42.

Example 20

An experiment similar to Example 19 was conducted in this example, except that the glass plate was replaced with an aluminum plate.

Example 21

An experiment similar to Example 19 was conducted in this example, except that the glass plate was replaced with a copper plate, and that the cyclohexane solution with 1% by volume of heptadecafluorodecyl trichlorosilane was replaced with an ethanol solution dissolving 1% by volume of heptadecafluorodecyl thiol.

Example 22

An experiment similar to Example 19 was conducted in this example, except that the glass plate was replaced with an alumite plate.

Example 23

An experiment similar to Example 19 was conducted in this example, except that the glass plate was replaced with a ceramic coffee plate.

Example 24

An experiment similar to Example 19 was conducted in this example, except that the glass plate was replaced with a nylon fabric.

Example 25

An experiment similar to Example 19 was conducted in this example, except that the glass plate was replaced with a polypropylene injection molding plate containing a silica filler.

Example 26

An experiment similar to Example 19 was conducted in this example, except that the glass plate was replaced with a plate made of Japanese cypress.

Example 27

An experiment similar to Example 19 was conducted in this example, except that the glass plate was replaced with an ordinary paper.

Reference 4

The glass plate of Example 19 with reduced size (5 cm×5 cm×0.5 cm) was dipped and held in a cyclohexane solution dissolving 1% by volume of heptadecafluorodecyl trichlorosilane in a nitrogen atmosphere for eighteen hours. The plate was washed with cyclohexane, and then with pure water.

Reference 5

After dipping and holding a copper plate (5 cm×5 cm×0.5 cm) of Example 22 in an ethanol solution dissolving 1% by volume of heptadecafluorodecyl thiol for eighteen hours, the plate was washed with ethanol.

The size of the substrates in Examples 19–27 was 5 cm×5 cm. The contact angles of water on the substrates in the examples and references were measured by an automatic contact angle gauge (manufactured by Kyowa Kaimen Kagaku: Form CA-Z). And the results are shown in Table 2.

TABLE 2

| | Substrate | Contact Angle of Water (°) |
|---|---|---|
| Example 19 | Glass Plate | 117 |
| Example 20 | Aluminum Plate | 119 |
| Example 21 | Copper Plate | 125 |
| Example 22 | Alumite Plate | 121 |
| Example 23 | Ceramics | 118 |
| Example 24 | Nylon Fabric | 151 |
| Example 25 | Polypropylene Plate | 115 |
| Example 26 | Plate of Japanese Cypress | 120 |
| Example 27 | Ordinary Paper | 148 |
| Reference 4 | Glass Plate | 117 |
| Reference 5 | Copper Plate | 125 |

As clearly seen from Table 2, the contact angles of the examples were the same as the angles of the references, whereby a chemically adsorbed film was formed by the method of dipping and holding the substrates.

The invention may be embodied in other specific forms without departing from the spirit or essential characteristics of the invention. The embodiments disclosed in this application are to be considered in all respects as illustrative and not restrictive, the scope of the invention being indicated by the appended claims rather than by the foregoing description, and all changes which come within the meaning and range of equivalency of the claims are embraced therein.

We claim:

1. A method of manufacturing a chemically adsorbed film, comprising the steps of:

spray-coating a solution containing a chlorosilane-based or thiol-based chemical adsorbent on a substrate surface comprising active hydrogen groups in a dry atmosphere, wherein the chemical adsorbent comprises chlorosilyl or thiol groups at one end of the molecules and at least one group selected from the group consisting of a straight hydrocarbon, fluorocarbon and siloxane chain; and generating a condensation reaction between said active hydrogen groups on said substrate surface and said chlorosilyl or thiol groups of said chemical adsorbent and forming a chemically adsorbed film on said substrate surface via covalent bonds.

2. The method of manufacturing the chemically adsorbed film according to claim 1, wherein the chemically adsorbed film is a chemically adsorbed monomolecular layer and the method further comprises the steps of:

washing away said solution comprising unreacted chlorosilane-based adsorbent left on said substrate surface with a nonaqueous organic solvent after said condensation reaction;

reacting said chlorosilyl groups left on said substrate surface with water;

and drying said substrate surface, thus forming said chemically adsorbed monomolecular layer on said substrate surface via covalent bonds.

3. The method of manufacturing the chemically adsorbed film according to claim 1, wherein the chemically adsorbed film is a chemically adsorbed polymer layer and the method comprises the steps of:

vaporizing said solution after said condensation reaction;

reacting said substrate surface with water;

and drying said substrate surface, thus forming said chemically adsorbed polymer layer on said substrate surface via covalent bonds.

4. The method of manufacturing the chemically adsorbed film according to claim 1, wherein the formation of a chemically adsorbed film is on the surface of an inorganic siloxane-based chemically adsorbed inner layer and the method comprises the steps of:

contacting a substrate surface comprising active hydrogen groups with a chlorosilane-based chemical adsorbent comprising numerous chlorosilyl groups in the molecule in a dry atmosphere;

generating a condensation reaction between said active hydrogen groups on said substrate surface and said chlorosilyl groups of said chemical adsorbent and forming an inorganic siloxane-based chemically adsorbed inner layer:

and finally forming a chemically adsorbed film on the surface of said inorganic siloxane-based chemically adsorbed inner layer via covalent bonds.

5. The method of manufacturing the chemically adsorbed film according to claim 4, wherein said forming a chemically adsorbed film on the surface of said inorganic siloxane-based chemically adsorbed inner layer comprises applying the chlorosilane-based chemical adsorbent to the surface of said inner layer by a spray gun.

6. The method of manufacturing the chemically adsorbed film according to claim 4, wherein the inorganic siloxane-based chemically adsorbed inner layer is a monomolecular layer and the method further comprises the steps of:

washing said solution comprising unreacted chlorosilane-based adsorbent comprising numerous chlorosilyl groups in the molecules left on said substrate surface with a nonaqueous organic solvent after said condensation reaction;

reacting said chlorosilyl groups remaining on said substrate surface with water;

and drying said substrate surface, thus forming said chemically adsorbed monomolecular inner layer.

7. The method of manufacturing the chemically adsorbed film according to claim 4, wherein the inorganic siloxane-based chemically adsorbed inner layer is a polymer layer and the method comprises the steps of:

vaporizing said solution on said substrate surface after said condensation reaction between said active hydrogen groups on said surface and said chlorosilyl groups of said chemical adsorbent;

reacting said substrate surface with water; and drying said substrate surface.

8. The method of manufacturing the chemically adsorbed film according to claim 1, 2, 3, 4, 5, 6 or 7, wherein at least one part of the hydrocarbon chain of said chlorosilane-based chemical adsorbent is substituted with a —$CF_2$— group.

9. The method of manufacturing the chemically adsorbed film according to claim 1, 2, 3, 4, 5, 6 or 7, wherein $CF_3(CF_2)_n(R)_mSiX_pCl_{3-p}$ (wherein n represents 0 or an integer; R represents an alkyl, vinyl, ethynyl, aryl group or a substituent comprising a silicon or oxygen atom; m represents 0 or 1; X represents H, an alkoxyl, alkoxyl group or a substituent comprising a fluoroalkyl or fluoroalkoxy group; p represents 0, 1 or 2) is used as said chlorosilane-based chemical adsorbent.

10. The method of manufacturing the chemically adsorbed film according to claim 4, 5, 6 or 7, wherein said chlorosilane-based adsorbent comprising chlorosilyl groups in the molecule used for forming said inner layer comprises at least one compound selected from the group consisting of $SiCl_4$, $SiHCl_3$, $SiH_2Cl_2$ and $Cl(SiCl_2O)_nSiCl_3$ (n represents an integer).

11. The method of manufacturing the chemically adsorbed film according to claim 1, 2, 3, 4, 6 or 7, wherein the substrate is selected from the group consisting of metal, ceramic, glass, plastic, paper, fiber and leather.

12. The method of manufacturing the chemically adsorbed film according to claim 11, wherein active hydrogens are added to said substrate beforehand by treatment in a plasma or corona atmosphere comprising oxygen.

13. The method of manufacturing the chemically adsorbed film according to claim 1, 2, 3, 4, 5, 6 or 7, wherein the chemical adsorptions are conducted in an atmosphere with relative humidity of 30% or less.

14. The method of manufacturing the chemically adsorbed film according to claim 2 or 6, wherein the boiling point of said solution comprising said chlorosilane-based adsorbent is 100° C. or above.

15. The method of manufacturing the chemically adsorbed film according to claim 3 or 7, wherein the boiling point of said solution comprising said chlorosilane-based adsorbent is between room temperature and 100° C.

16. The method of manufacturing the chemically adsorbed film according to claim 1, wherein said solution is sprayed by a spray gun.

* * * * *